United States Patent
Michaelis et al.

(10) Patent No.: US 11,595,509 B2
(45) Date of Patent: Feb. 28, 2023

(54) TELECOMMUNICATIONS SOFT CLIENT HAVING A GUI-LESS OPERATING MODE

(71) Applicant: Avaya Management L.P., Santa Clara, CA (US)

(72) Inventors: Paul Roller Michaelis, Louisville, CO (US); Bradley Raymond Black, Ottawa (CA)

(73) Assignee: Avaya Management L.P., Santa Clara, CA (US)

( * ) Notice: Subject to any disclaimer, the term of this patent is extended or adjusted under 35 U.S.C. 154(b) by 55 days.

(21) Appl. No.: 17/032,440

(22) Filed: Sep. 25, 2020

(65) Prior Publication Data

US 2021/0281675 A1     Sep. 9, 2021

Related U.S. Application Data

(60) Provisional application No. 62/985,618, filed on Mar. 5, 2020.

(51) Int. Cl.
| | | |
|---|---|---|
| *H04M 1/72448* | (2021.01) | |
| *G06F 3/048* | (2013.01) | |
| *H04M 1/02* | (2006.01) | |
| *H04M 1/72466* | (2021.01) | |

(52) U.S. Cl.
CPC ........ *H04M 1/72448* (2021.01); *G06F 3/048* (2013.01); *H04M 1/0266* (2013.01); *H04M 1/72466* (2021.01)

(58) Field of Classification Search
CPC ........... H04M 1/72448; H04M 1/0266; H04M 1/72466; H04M 1/2535; H04M 1/578; H04M 1/2476; G06F 3/048; G06F 3/165; G06F 3/167; G09B 21/005; G09B 21/006
See application file for complete search history.

(56) References Cited

U.S. PATENT DOCUMENTS

| | | | | |
|---|---|---|---|---|
| 5,655,014 | A * | 8/1997 | Walsh | H04M 1/2473 379/242 |
| 5,790,652 | A * | 8/1998 | Gulley | H04M 1/27475 379/433.07 |
| 6,654,038 | B1 * | 11/2003 | Gajewska | G06F 8/38 345/168 |
| 6,952,577 | B2 | 10/2005 | Michaelis et al. | |

(Continued)

OTHER PUBLICATIONS

International Search Report and Written Opinion issued in PCT Application No. PCT/US2021/021257 dated Jun. 9, 2021, 15 pages.

*Primary Examiner* — Ryan F Pitaro

(57) ABSTRACT

The technology disclosed herein enables narration of occurrences in a telecommunications soft client operating in a GUI-less mode. In a particular embodiment, a method includes, in a user system, operating the telecommunications soft client in a first mode. In the first mode, the user system does not present a GUI to a user for the telecommunications soft client. A screen reader application is also executing on the user system. While in the first mode, the method includes audibly describing a first occurrence for the telecommunications soft client and receiving global user input into the telecommunications soft client. The screen reader application describes a second occurrence for a first application executing, and displaying an application window, on the user system.

20 Claims, 7 Drawing Sheets

(56) References Cited

U.S. PATENT DOCUMENTS

| | | | |
|---|---|---|---|
| 8,626,237 B2* | 1/2014 | Boyaci | H04M 1/6066 |
| | | | 455/557 |
| 9,054,910 B1 | 6/2015 | Burritt et al. | |
| 9,215,316 B1* | 12/2015 | Michaelis | H04M 3/42042 |
| 2006/0288283 A1* | 12/2006 | Schrepp | G06F 9/451 |
| | | | 715/700 |
| 2007/0061749 A1* | 3/2007 | de Souza | G06F 3/0481 |
| | | | 715/767 |
| 2007/0198945 A1* | 8/2007 | Sun | G09B 21/006 |
| | | | 715/779 |
| 2008/0008162 A1* | 1/2008 | Martinez | H04L 45/12 |
| | | | 370/352 |
| 2009/0091430 A1* | 4/2009 | Ryan | G09B 21/006 |
| | | | 340/384.1 |
| 2009/0113452 A1* | 4/2009 | Grigsby | G06F 9/542 |
| | | | 719/318 |
| 2012/0266067 A1* | 10/2012 | Armstrong | H04S 5/005 |
| | | | 715/716 |
| 2013/0018945 A1* | 1/2013 | Vendrow | G06F 3/0484 |
| | | | 709/203 |
| 2013/0031477 A1* | 1/2013 | Bilinski | G06F 9/451 |
| | | | 715/716 |
| 2013/0263251 A1 | 10/2013 | Fleizach et al. | |
| 2015/0119108 A1* | 4/2015 | Philbin | H04W 52/0267 |
| | | | 455/566 |
| 2015/0363376 A1* | 12/2015 | Anderson | G06F 3/04817 |
| | | | 715/224 |
| 2016/0147544 A1* | 5/2016 | Kaplan | G06F 21/45 |
| | | | 715/712 |
| 2016/0259535 A1 | 9/2016 | Fleizach et al. | |
| 2018/0053498 A1* | 2/2018 | Kraft | G10L 13/033 |
| 2020/0319848 A1* | 10/2020 | Kim | G06F 3/023 |
| 2021/0407507 A1* | 12/2021 | Zhou | G06F 3/167 |
| 2022/0327036 A1* | 10/2022 | Jiang | H04B 1/3818 |

* cited by examiner

TELECOMMUNICATIONS SOFT CLIENT HAVING A GUI-LESS OPERATING MODE

RELATED APPLICATIONS

This application is related to and claims priority to U.S. Provisional Patent Application 62/985,618, titled "TELECOMMUNICATIONS SOFT CLIENT THAT DOES NOT INTERFERE WITH A SCREEN READER APPLICATION," filed Mar. 5, 2020, and which is hereby incorporated by reference in its entirety.

TECHNICAL BACKGROUND

Software applications exist that allow personal computers to be used as real-time telecommunication endpoints (commonly referred to as "soft clients"). Examples include Skype, Cisco Jabber and Avaya IX Workplace. All of these soft clients present information, such as Caller Identification and whether a call is on hold, visually on a display using a graphical user interface (GUI). Blind users of personal computers utilize specialized text-to-speech screen-reading software in order to access visually presented information. By far, the most commonly used screen reader is a product called JAWS (Job Access With Speech), although other screen readers exist.

Although many telecommunications soft clients are compatible with the screen reader, there is a usability problem with this configuration. The screen reader, as implied by its name, is a screen-reading application and its text-to-speech functionality is limited to the window that has focus. As a result, a blind person who wants to use an app on their client (e.g., monitoring events that are changing in a real-time spreadsheet) at the same time they are engaging in complex telephony operations must necessarily change focus back and forth, and may miss information that is presented by the app that does not have focus. (Sighted people do not have this problem because windows that don't have focus can still be visible.)

SUMMARY

The technology disclosed herein enables narration of occurrences in a telecommunications soft client operating in a GUI-less mode. In a particular embodiment, a method includes, in a user system, operating the telecommunications soft client in a first mode. In the first mode, the user system does not present a GUI to a user for the telecommunications soft client. A screen reader application is also executing on the user system. While in the first mode, the method includes audibly describing a first occurrence for the telecommunications soft client and receiving global user input into the telecommunications soft client. The phrases "global user input" and "global command" apply to inputs and commands that elicit a response from the telecommunications soft client regardless of whether the telecommunications soft client, or another application window, has focus. The screen reader application describes a second occurrence for a first application executing, and displaying an application window, on the user system.

In some embodiments, the method includes operating the telecommunications soft client in the first mode in response to determining that the screen reader application is executing on the user system.

In some embodiments, the method includes operating the telecommunications soft client in the first mode in response to input from the user selecting the first mode over at least a second mode that presents the GUI for the telecommunications soft client.

In some embodiments, the global user input comprises an instruction in an instruction group comprising a call answer instruction, a call mute instruction, a call hold instruction, and a call initiation instruction.

In some embodiments, audibly describing the first occurrence comprises generating speech that conveys the first occurrence to the user.

In some embodiments, the first occurrence comprises an event in an event group comprising an incoming call request, a new voicemail notification, and a feature status notification.

In some embodiments, the application window is a current focus window on the user system.

In some embodiments, audibly describing the first occurrence uses a first speaker of the user system and the screen reader application describes the second occurrence using a second speaker of the user system.

In some embodiments, audibly describing the first occurrence uses a first voice and the screen reader application describes the second occurrence using a second voice.

In some embodiments, the global user input comprises a key combination input into a user interface of the user system that is mapped to the telecommunications soft client.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to operate the telecommunications soft client in a first mode. In the first mode, the user system does not present a GUI to a user for the telecommunications soft client. A screen reader application is also executing on the user system. While in the first mode, the program instructions direct the processing system to audibly describe a first occurrence for the telecommunications soft client and receive global user input into the telecommunications soft client. The screen reader application describes a second occurrence for a first application executing, and displaying an application window, on the user system.

DETAILED DESCRIPTION

The telecommunications soft client described herein address shortcomings of screen reader software, especially with regard to users who are blind, by providing audible notifications of telephony events (e.g., Caller ID, whether a call is on hold, receipt of new voicemail) via a mechanism that is independent of, and does not interfere with, screen reader software also executing on a user system. The lack of interference with the screen reader software, including an ability to use the screen reader with a visible application that has focus while concurrently using the soft client for telephony operations, is achieved by providing a soft client mode in which there is no GUI. Specifically, because the soft client has no GUI, there is no ability to capture focus, nor is there a need for focus in order to provide voice notifications of telephony events, thereby leaving the screen reader free to support applications with GUI's, which the screen reader requires to be the focus window to provide accessibility to blind users (or other users who find the screen reader beneficial).

Figure 1:
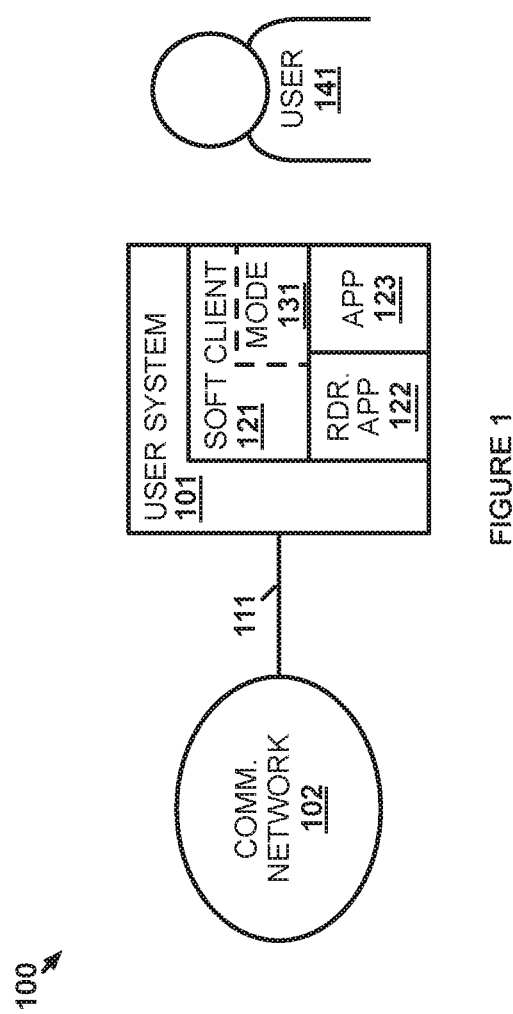
FIG. 1 illustrates an implementation for operating a telecommunications soft client in a GUI-less mode.

FIG. 1 illustrates implementation 100 for operating a telecommunications soft client in a GUI-less mode. Implementation 100 includes user system 101 and communication network 102. User system 101 and communication network 102 communication over communication link 111. Communication link 111 may be wired and/or wireless. Communication link 111 is shown as a direct link but may include intervening systems, networks, and/or devices. User system 101 may be a telephone, laptop, personal computer, tablet computer, or some other type of user operable computing system. Communication network 102 includes one or more networks, such as a circuit switched telephone network, local area packet network, wide area network (e.g., the Internet), or some other type of network over which telecommunications may be carried including combinations thereof.

In operation, user system 101 executes telecommunications soft client 121, screen reader application 122, and application 123. User 141 operates user system 101, in part, by interacting with user interfaces of telecommunications soft client 121, screen reader application 122, and application 123. Telecommunications soft client 121 allows user 141 to telecommunicate with one or more other users, via their respective user systems, over communication network 102. The other user systems may also execute a telecommunications soft client like telecommunications soft client 121 or may communicate over communication network 102 in some other manner (e.g., may be a circuit switched telephone). Telecommunications between user system 101 and the one or more other user systems may be communication sessions over which voice, video, text, or some other type of user communications are exchanged—including combinations thereof.

User system 101 also executes application 123. Application 123 is any type of application having a GUI with which user 141 may interact. Application 123 may be an office productivity application (e.g., word processing, spreadsheet, etc.), an email client, a service ticketing application, a web browser, or any other type of application executable by user system 101. User system 101 further executes screen reader application 122. Screen reader application 122 is an application that assists users by providing audible information to user 141 (e.g., through one or more speakers of user system 101). Screen reader application 122 may simply perform text-to-speech conversion of words on a display of user system 101 or may provide additional information about what is being displayed (e.g., information about events that occur in an application or an operating system of user system 101, information about icons being displayed, information about menu options being displayed, etc.). Essentially, the information provided by screen reader application 122 allows user 141 to operate user system 101 (e.g., interact with the applications and/or operating system thereon) without necessarily being able to view a display of user system 101, as may be the case if user 141 is visually impaired. Screen reader application 122 may require that a window for an application be the current focus window (e.g., the window that is at the forefront on a desktop being displayed by user system 101) in order to provide screen reading functionality to the application, as opposed to operating on other applications (having windows or otherwise) or the operating system of user system 101. In those cases, screen reader application 122 will provide information about the focus-window application, while not providing information about other applications.

Figure 2:
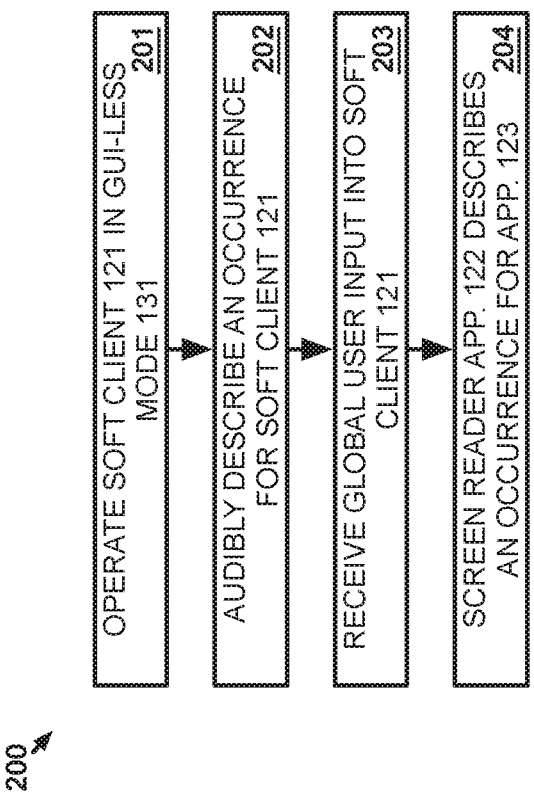
FIG. 2 illustrates an operational scenario wherein a telecommunications soft client operates in a GUI-less mode.

FIG. 2 illustrates operational scenario 200 wherein a telecommunications soft client operates in a GUI-less mode. In operational scenario 200, telecommunications soft client 121 is operating on user system 101 in GUI-less mode 131 (201). When operating in GUI-less mode 131, user system 101 does not present a GUI to user 141 for telecommunications soft client 121. User system 101 does not present a GUI for telecommunications soft client 121 because telecommunications soft client 121 has no GUI in GUI-less mode 131. As such, there is no GUI and, consequently, no application window for user system 101 to present. Telecommunications soft client 121 may have multiple operating modes or may have only GUI-less mode 131. For example, telecommunications soft client 121 may include at least one operating mode, other than GUI-less mode 131, that has a GUI of some type.

When telecommunications soft client 121 is operating in GUI-less mode 131 while executing on user system 101, telecommunications soft client 121 audibly describes an occurrence for telecommunications soft client 121 (202). The occurrence may be an event that happens in telecommunications soft client 121, may be a notification generated by telecommunications soft client 121, may be information that would be displayed had telecommunications soft client 121 been operating in a mode that had a GUI, may be status information, or may be some other type of information that would be useful to user 141's use of telecommunications soft client 121. The occurrence may include an incoming call, a caller's identity (e.g., caller ID), receipt of a new voice message, a status update that new voice messages available, a status update that no new voice messages, a call disconnecting, another party leaving a communication session, call forwarding being turned on/off, call forwarding status, or some other type of occurrence relevant to telecommunications. As should be gleaned from the above examples, the occurrence may be an event that happens in real-time, may be a status update describing a current state of telecommunications soft client 121, or may be some other information related to the operation of telecommunications soft client 121. In some examples, the occurrence may happen at the request of user 141 (e.g., user 141 may request a status update). Similarly, rather than having to explicitly request a status update each time user 141 desires a description of a status update occurrence, user 141 may be able to define when particular status update items should be described (e.g., once every hour or upon a change happening). To audibly describe the occurrence, telecommunications soft client 121 directs user system 101 to produce sound that describes the occurrences. The sound may be voice (e.g., a synthetically generated voice or prerecorded voice) that explicitly describes the occurrence in words (e.g., a voice that says "you have an incoming call from Paul") or may be another type of sound (e.g., tone, tone pattern, etc.) that user 141 associates with a corresponding occurrence.

In this example, telecommunications soft client 121 also receives global user input from user 141 (203). Since telecommunications soft client 121 is operating in GUI-less mode 131, there is no GUI into which user 141 can provide input to telecommunications soft client 121 (e.g., input to answer an incoming communication session request or request playback of a voicemail). Global user input is user input that an operating system directs to a corresponding application regardless of whether that application is currently the focus. Global user input may include a pattern of keystrokes into a keyboard, mouse/trackpad gestures, touchscreen gestures, audible voice commands, or some other type of input. In some examples, certain user input (e.g., key combination) may indicate telecommunications soft client 121 while input received subsequent to that particular input corresponds to a particular instruction to telecommunications soft client 121. For instance, user 141 may press the control key and the space bar at the same time to notify user system 101 that the following user input should be directed to telecommunications soft client 121. In other examples, input corresponding to a particular instruction to telecommunications soft client 121 does not require that input indicating telecommunications soft client 121 first be received. The instructions to telecommunications soft client 121 may include instructions that direct telecommunications soft client 121 to take actions that include accepting an incoming communication session request, initiating a communication session, ending a communication session, ignoring a communication session request, holding/un-holding a call, muting/un-muting a call, stopping the audible description of an occurrence, redialing, transferring a call, selecting a contact, selecting a message, or any other type of action that may occur within a telecommunications soft client. The global user input may be defined by a user, such as user 141, by telecommunications soft client 121, or by some other entity.

While telecommunications soft client 121 is handling the description of occurrences in telecommunications soft client 121, screen reader application 122 is able to describe occurrences for application 123, which does display a GUI with which user 141 can interact (204). The occurrences could be any type of event or information available in application 123 depending on the type of application. For example, application 123 may be a spreadsheet application and the occurrence could be user 141 selecting cells in a spreadsheet. Screen reader application 122 may generate speech that reads the contents of those selected cells aloud to user 141. Since telecommunications soft client 121 handles descriptions of occurrences therein, even if screen reader application 122 only provides functionality to the application window having focus, user 141 can still hear descriptions of telecommunications soft client 121 even when a window of telecommunications soft client 121 is not the window currently having focus. User 141 is, therefore, free to user other applications on user system 101 without worrying that an occurrence in telecommunications soft client 121 will be missed due to a window of telecommunications soft client 121 not currently having focus.

It should be understood that, while step 203 is described after step 202 in operational scenario 200, it is possible that telecommunications soft client 121 would receive global user input prior to an occurrence that triggers an audible description by telecommunications soft client 121. In those examples, step 203 would occur before step 202. Of course, step 202 and step 203 may repeat any number of times due to additional occurrences triggering audible description by telecommunications client 121 and additional global user input directed to telecommunications client 121.

Figure 3:
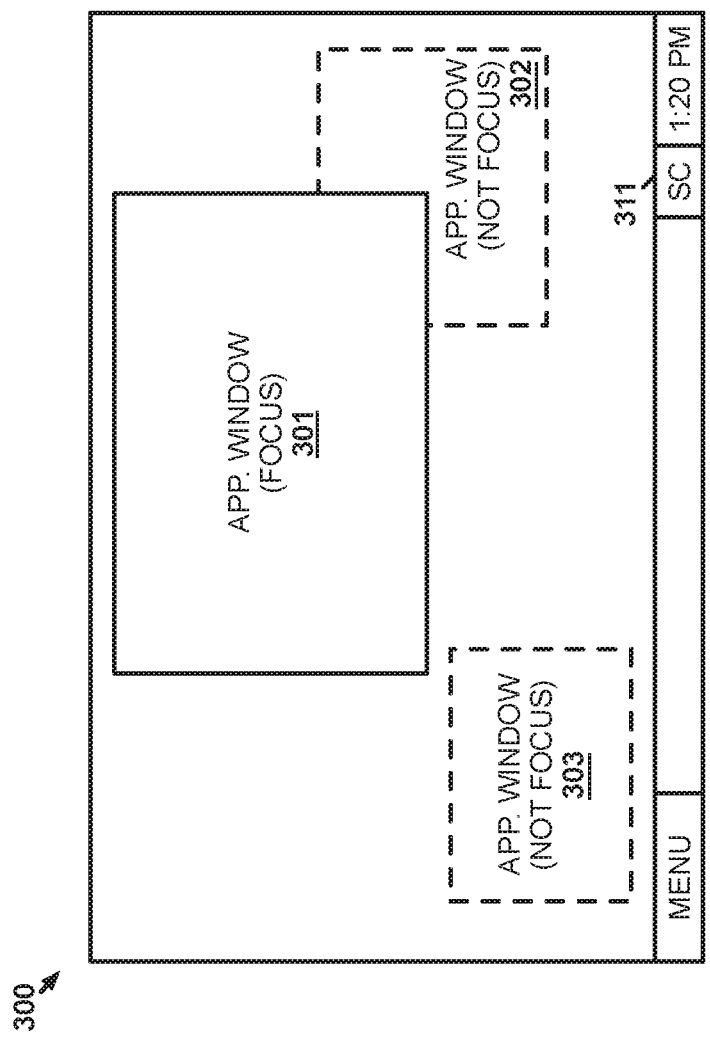
FIG. 3 illustrates a desktop wherein a telecommunications soft client operates in a GUI-less mode.

FIG. 3 illustrates desktop 300 wherein a telecommunications soft client operates in a GUI-less mode. Desktop 300 is an example GUI of an operating system executing on user system 101 and is displayed by a display of user system 101. Desktop 300 includes application window 301, which is currently the focus window, and application windows 302 and 303, which are not currently the focus window. Application window 301 may be the focus because a user of desktop 300 may have more recently selected application window 301 (e.g., clicked within application window 301), application window 301 may be most recently launched, or some other manner in which user 141 may indicate that application window 301 should be the focus of their attention on desktop 300. Application window 301 is a window of application 123. Application windows 302 and 303 may also be application windows of application 123 or may be application windows of one or more other applications executing on user system 101.

By virtue of application window 301 being the focus application window, screen reader application 122 will audibly describe to user 141 the contents of and/or events occurring within application window 301 (e.g., will use a speaker of user system to output audio, such as a synthesized voice or event specific tones, describing application window 301). In this example, while application window 301 is the focus window, screen reader application 122 does not audibly describe anything within application window 302 or application window 303. Should the focus window switch from application window 301 to one of application window 302 or application window 303, then screen reader application 122 would also switch to audibly describing to user 141 the contents and/or events occurring within the new focus window and not application window 301. As such, a user who is unable to see what is happening in a window that is not the focus (e.g., a blind user), may miss events that occur in a non-focus window because screen reader application 122 will not report those events.

In this example, telecommunications soft client 121 is operating in GUI-less mode 131. Soft client icon 311 is located in the menu bar to show that telecommunications soft client 121 is executing but does not present a GUI for controlling telecommunications soft client 121. In other examples, there may be no visual indicator on desktop 300 that telecommunications soft client 121 is executing. Similarly, though not shown in this example, desktop 300 may present a visual indicator that screen reader application 122 is running. In some examples, telecommunications soft client 121 may detect when screen reader application 122 is in use and automatically switch to a non-GUI mode if telecommunications soft client 121 also has a GUI mode. When telecommunications soft client 121 is in GUI-less mode 131, user 141 may interact with telecommunications soft client 121 via commands received in global user input (e.g., voice input, keyboard input, etc.) within the operating system of user system 101. These global commands automatically apply to telecommunications soft client 121 even if another application window is in focus. The global commands may be used to initiate a communication session, end a communication session, mute user system 101's microphone, add participants to a session, or perform some other action that may otherwise be performed if telecommunications soft client 121 was presenting a user interface.

Since telecommunications soft client 121 does not have a GUI window, screen reader application 122 cannot describe the occurrences (e.g., events, contents, statuses, etc.) within that non-existent window. Advantageously, screen reader application 122 will never operate on a window for telecommunications soft client 121 and miss describing occurrences in another window that occur when telecommunications soft client 121's window is the focus. Telecommunications soft client 121 instead includes its own narrator functionality that audibly describes to user 141 events occurring with respect to telecommunications soft client 121 (e.g., identifying new participants joining/leaving a communication session, indicating that a communication session is being established, indicating how long a session has been running, indicating a line status, etc.). The narrator functionality as a whole may be included in telecommunications soft client 121 (e.g., telecommunications soft client 121 itself provides audio output information to the speakers, headset, or other audio device, of user system 101) or telecommunications soft client 121 may leverage other applications and/or the operating system of user system 101 (e.g., telecommunications soft client 121 indicates to another application or the operating system what is occurring in telecommunications soft client 121 and the other application or operating system generates and provides the audio output information to the speakers, headset, or other audio device, of user system 101).

When using telecommunications soft client 121 in GUI-less mode 131 described above, user 141 is able to interact with telecommunications soft client 121 and be provided with audio descriptions of occurrences with respect to telecommunications soft client 121 (e.g., to participate in a conference call) while not needing to take another application window, such as application window 301, out of focus. Screen reader application 122 can, therefore, describe application window 301 (or any other window that becomes the focus) while telecommunications soft client 121's own mechanisms describe the events occurring with respect to telecommunications soft client 121. In some examples, telecommunications soft client 121's audio output may be configured such that the voice (synthesized, prerecorded, or otherwise) used by telecommunications soft client 121 is different than the voice used by screen reader application 122 (e.g., a male voice may be used by screen reader application 122 while telecommunications soft client 121 may use a female voice). The different voices will allow user 141 to more easily distinguish between descriptions provided by screen reader application 122 and telecommunications soft client 121.

Figure 4:
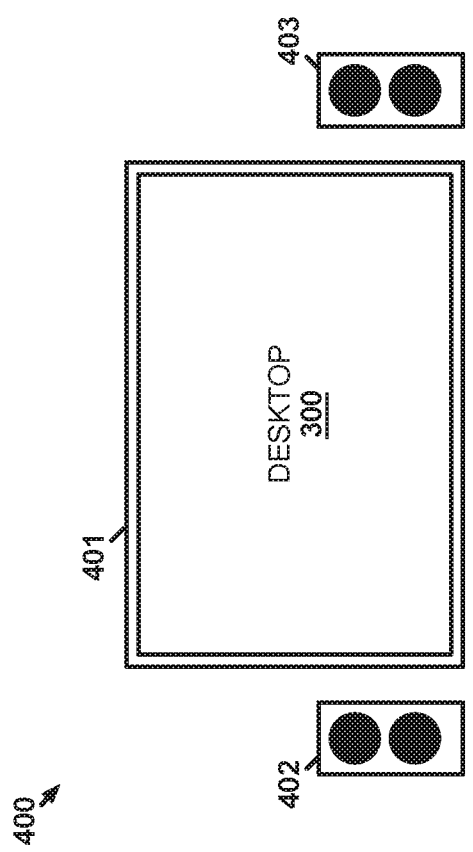
FIG. 4 illustrates an implementation for operating a telecommunications soft client in a GUI-less mode.

FIG. 4 illustrates implementation 400 for operating a telecommunications soft client in a GUI-less mode. Implementation 400 includes display 401, speaker 402, and speaker 403. Display 401 is a display of user system 101 in this example. While shown separately, speaker 402 and speaker 403 may be incorporated into display 401 or some other component of user system 101 (e.g., into the palm rest assembly of user system 101 if user system 101 is a laptop). As discussed above, different voices may be used to differentiate between descriptions from telecommunications soft client 121 and screen reader application 122. In this example, audio output from screen reader application 122 may be directed through speaker 402 while audio output from the narration functionality of telecommunications soft client 121 may be directed through speaker 403. User 141 should then more easily be able to differentiate whether a description is coming from telecommunications soft client 121 or screen reader application 122 based on from which speaker of speakers 402 and 403 that user 141. Using the two different speakers in this manner may be the only manner in which descriptions from telecommunications soft client 121 and screen reader application 122 are differentiated or may be used in conjunction with other types of differentiators, such as the different voices described above.

While implementation 400 includes two speakers, other types of audio output components may be used in other examples. For example, user 141 may wear a headset connected to user system 101. Audio from screen reader application 122 may use the headset to present descriptions to user 141 while audio from telecommunications soft client 121 may use an internal speaker of user system 101.

Figure 5:
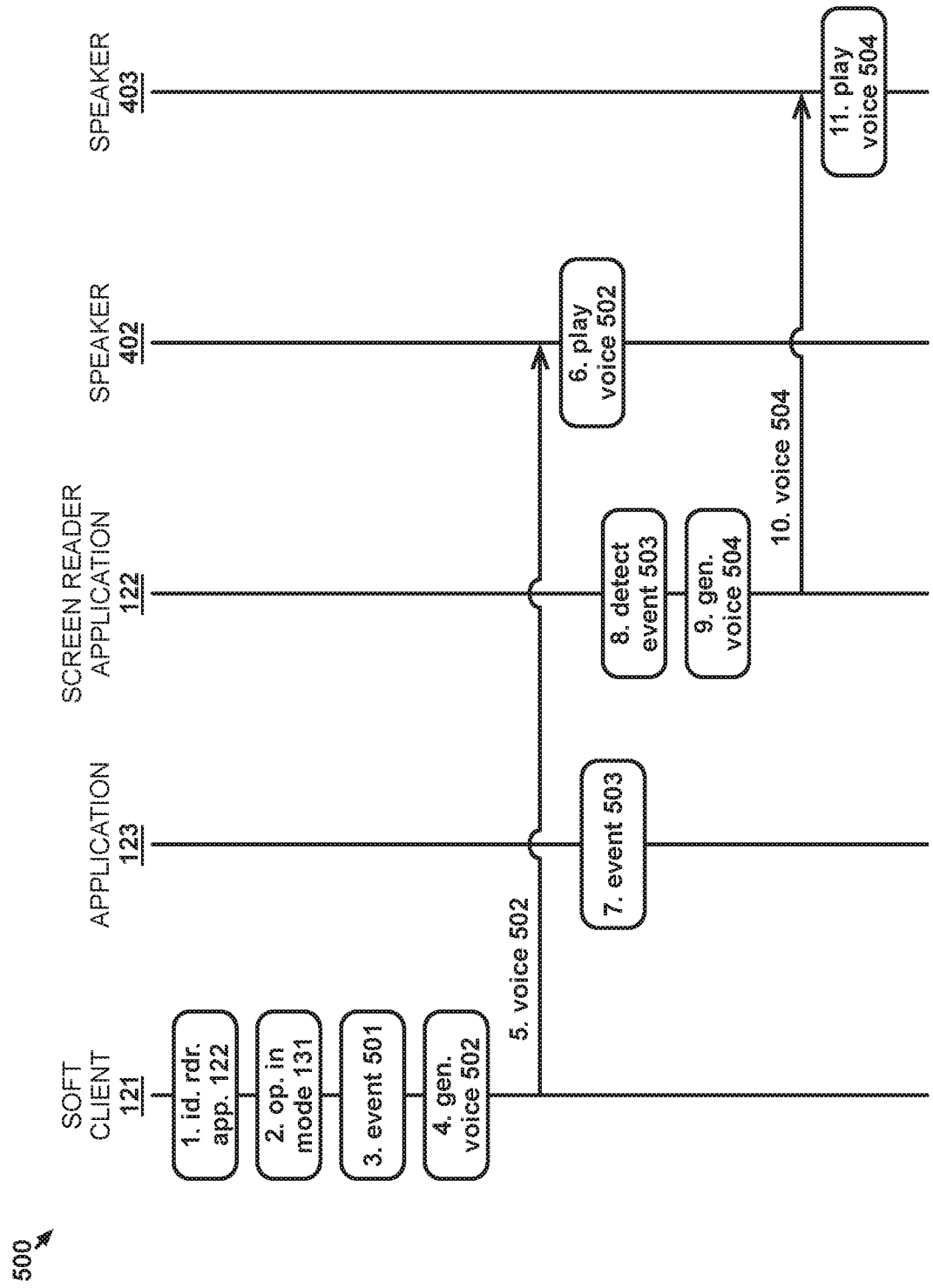
FIG. 5 illustrates an operational scenario wherein a telecommunications soft client operates in a GUI-less mode.

FIG. 5 illustrates operational scenario 500 wherein a telecommunications soft client operates in a GUI-less mode. Operational scenario 500 is an example of implementations 100, 300, and 400. While software applications (i.e., telecommunications soft client 121, application 123, and screen reader application 122) are described as performing various steps of operational scenario 500, it should be understood that the steps are performed by user system 101 at the direction of the respective applications. In operational scenario 500, telecommunications soft client 121 automatically determines that screen reader application 122 is executing and enabled (i.e., active to describe occurrences) on user system 101 at step 1. Telecommunications soft client 121 may communicate with screen reader application 122 to determine that screen reader application 122 is enabled or may communicate with an operating system of user system 101 to determine that screen reader application 122 is enabled. For instance, a component of the operating system may be accessed (e.g., through an Application Programing Interface) to determine whether any accessibility applications, such as screen reader application 122, are enabled on user system 101.

Upon determining that screen reader application 122 is enabled, telecommunications soft client 121 operates in GUI-less mode 131 at step 2. Telecommunications soft client 121 may have previously been operating in a mode with a GUI prior to determining that screen reader application 122 is enabled and automatically switches to GUI-less mode 131 during step 2. Alternatively, steps 1 and 2 may be performed upon starting the execution of telecommunications soft client 121 and, as such, GUI-less mode 131 becomes the initial operating mode for telecommunications soft client 121 upon opening. When GUI-less mode 131 is enabled for telecommunications soft client 121, telecommunications soft client 121 narrates information about its own operation (e.g., occurrences therein) and does not present a GUI to avoid interfering with screen reader application 122's narration of other applications.

In this example, event 501 occurs within telecommunications soft client 121. Event 501 may be an incoming communication session request, a new message arrival, or any other type of event that may happen in a telecommunications soft client. Responsive to the occurrence of event 501, telecommunications soft client 121 generates voice 502, which describes event 501. For example, the voice may say, "event 501 has occurred". Voice 502 may be synthesized, may be a prerecorded message (e.g., telecommunications soft client 121 may select a prerecorded message, from many prerecorded messages available to telecommunications soft client 121, that corresponds to event 501), may be a combination of prerecorded words or phrases (e.g., telecommunications soft client 121 may piece together a message of voice 502), or may generate voice 502 in some other manner. At this point, voice 502 is a digitized representation of the sound of voice 502 (e.g., a digitized waveform). In some examples, telecommunications soft client 121 may employ one or more components of the operating system of user system 101 to generate voice 502. For instance, the operating system may include a text-to-speech accessibility feature that telecommunications soft client 121 directs to generate voice 502.

Once voice 502 is generated, telecommunications soft client 121 sends voice 502 at step 5 to speaker 402 so that speaker 402 can play voice 502 at step 6. A component of the operating system of user system 101 (e.g., an audio device driver or the above-mentioned accessibility feature) may be accessed by telecommunications soft client 121 to enable telecommunications soft client 121 to output sound through speaker 402. In one example, telecommunications soft client 121 may explicitly instruct the operating system to play voice 502 through speaker 402. In another example, telecommunications soft client 121 voice 502 may be generated to only use the left stereo channel, which would not produce any sound out of the right stereo channel (i.e., speaker 403).

In this example, a voice (i.e., voice 502) is used to audibly describe event 501. In other examples, as mentioned above, a tone, pattern of tones, or some other non-voice audio may be used. For instance, a specific tone frequency/duration corresponding to event 501 may be generated by telecommunications soft client 121. Likewise, in some examples, GUI-less mode 131 may include different audio output modes, such as one mode that describes occurrences using voice and another mode that uses non-voice sounds (e.g., tones). Those audio output modes may be user selectable (e.g., using global user input) or may switch automatically upon a condition(s) being met. For instance, a voice output mode may be used when telecommunications soft client 121 is not connected to a call and a tone output mode may be used when telecommunications soft client 121 is connected to a call.

While telecommunications soft client 121 is operating in GUI-less mode 131, event 503 occurs step 7 in application 123. In this example, screen reader application 122 is configured to describe occurrences in an application window that is currently the focus window on user system 101. Since application 123 is currently the focus window 301 on desktop 300 of user system 101, screen reader application 122 detects event 503 at step 8. Screen reader application 122 may detect event 503 by performing image analysis on window 301, may communicate with application 123, the operating system, or some other software component of user system 101, to receive an indication that event 503 occurred, or may detect event 503 in some other manner. Screen reader application 122 generates voice 504 at step 9 in a manner similar to those discussed above with respect to the generation of voice 502. Once voice 504 is generated, screen reader application 122 sends voice 504 to speaker 403 at step 10 and speaker 403 plays voice 504 at step 11. Screen reader application 122 may send voice 504 in a manner similar to that discussed above when telecommunications soft client 121 sent voice 502 to speaker 402.

Advantageously, user 141 hears voice 502 from speaker 402 and voice 504 from speaker 403. Hearing voices 502 and 504 from different locations (i.e., from the locations of speakers 402 and 403) helps user 141 differentiate from which narrator a description originated. Descriptions from telecommunications soft client 121 would be heard from speaker 402 and descriptions from screen reader application 122 would be heard from speaker 403. Further differentiations may also be used to aid user 141, such as using a female voice for telecommunications soft client 121 and a male voice for screen reader application 122.

Figure 6:
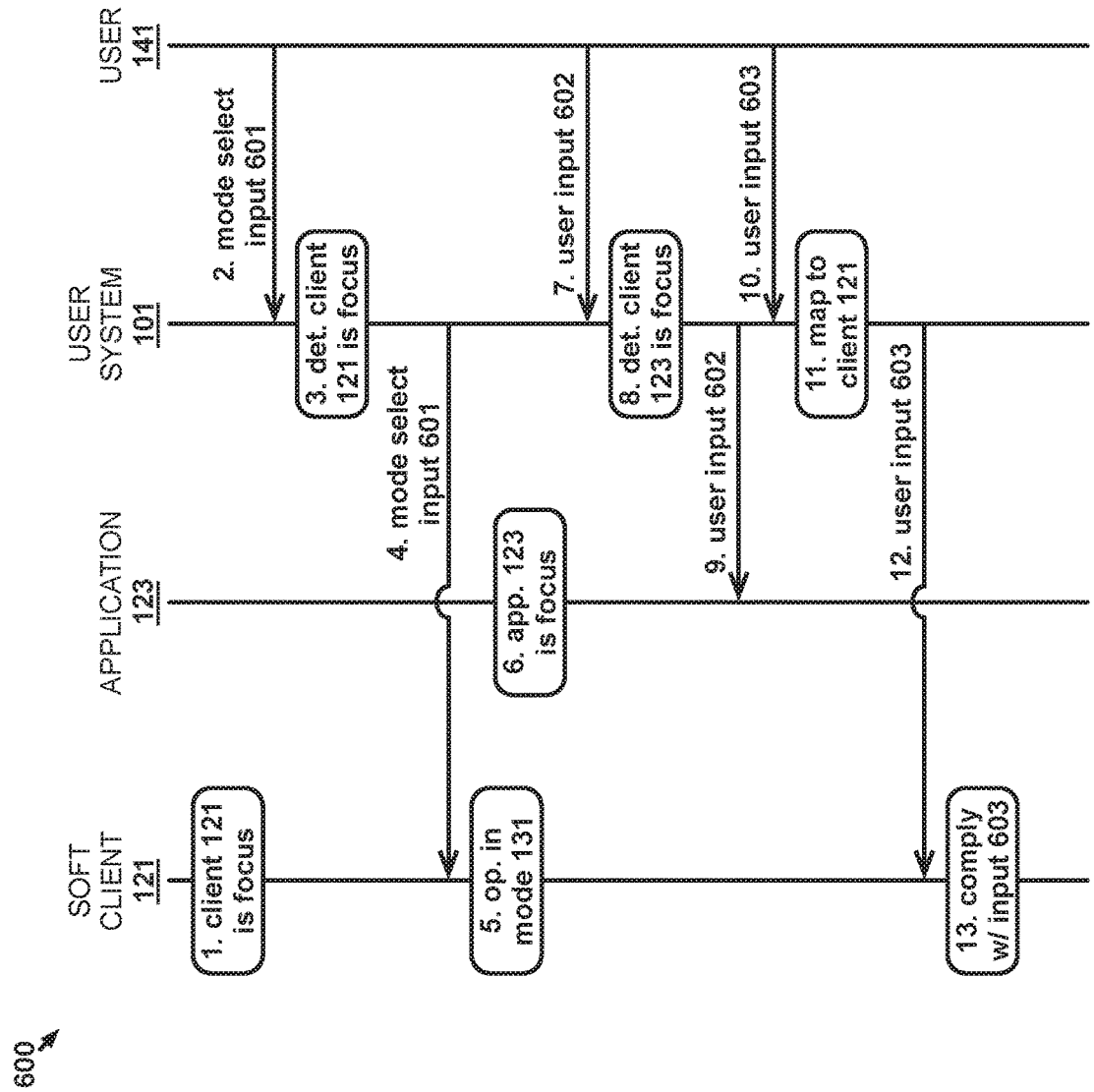
FIG. 6 illustrates an operational scenario wherein a telecommunications soft client operates in a GUI-less mode.

FIG. 6 illustrates operational scenario 600 wherein a telecommunications soft client operates in a GUI-less mode. Operational scenario 600 is an example of implementations 100, 300, and 400. In particular, operational scenario 600 is an example of how user input is handled when telecommunications soft client 121 is operating in GUI-less mode 131. Operational scenario 600 begins with telecommunications soft client 121 as the focus window on user system 101 at step 1. In order to be the focus window, telecommunications soft client 121 is operating in a mode that includes a GUI for the window. User 141 provides mode select input 601 at step 2 into user system 101. Mode select input 601 is an instruction from user 141 for telecommunications soft client 121 to operate in GUI-less mode 131. Mode select input 601 may be mouse pointer or touchscreen input into the window of telecommunications soft client 121, voice command, keyboard input while telecommunications soft client 121 is in focus, or some other type of input that an application can receive when in focus. Upon receiving mode select input 601, user system 101 (or an operating system thereof) determines that mode select input 601 is not global input directed to a specific application (e.g., determines that mode select input 601 does not match criteria defined for any global input) and, therefore, determines at step 3 that, since telecommunications soft client 121 is the focus window, mode select input 601 should be directed to telecommunications soft client 121. Mode select input 601 is then provided to telecommunications soft client 121 at step 4 accordingly.

Upon receiving mode select input 601, telecommunications soft client 121 complies with mode select input 601 and begins operating in GUI-less mode 131 at step 5. Beginning to operate in GUI-less mode 131 means that the GUI window of telecommunications soft client 121 that allowed telecommunications soft client 121 to be the focus no longer exists on user system 101. As such, another application window, or a desktop of user system 101's operating system, will become the new focus. In this example, a window for application 123 becomes the focus (e.g., window 301 from desktop 300) at step 6. Subsequent to a window of application 123 becoming the focus, user system 101 receives user input 602 from user 141. Like mode select input 601, user system 101 (or an operating system thereof) determines that user input 602 is not global input directed to a specific application (e.g., determines that user input 602 does not match criteria defined for any global input) and, therefore, determines at step 8 that, since application 123 is the focus window, user input 602 should be directed to application 123. User input 602 is then provided to application 123 at step 9 accordingly.

While telecommunications soft client 121 is operating in GUI-less mode 131 and application 123 is the focus window, user system 101 also receives user input 603 at step 10. Upon receiving user input 603, user system 101 (or an operating system thereof) determines that user input 603 is global user input that maps to telecommunications soft client 121 at step 11. User system 101 may store a data structure, such as a table, that includes mappings of global user input (e.g., particular key combinations, mouse/screen gestures, voice commands, etc.) to particular applications. In this example, the data structure would indicate that user input 603 maps to telecommunications soft client 121. Other manners of identifying that user input 603 constitutes global user input may also be used.

After determining that user input 603 maps to telecommunications soft client 121, user input 603 is passed to telecommunications soft client 121 rather than application 123, which is currently the focus window, as was user input 602. Upon receiving user input 603, telecommunications soft client 121 complies with the instruction provided by user input 603. For example, user input 603 may be an instruction to initiate a call, to playback voicemail, provide a status update (e.g., a number of new messages), or to perform any other action of which telecommunications soft client 121 is capable. In a more specific example, receipt of user input 603 may be event 501 from operational scenario 500 and may request a status update from telecommunications soft client 121. Voice 502 from operational scenario 500 may then provide the status update to user 141. Global user input that maps to telecommunications soft client 121 may only map to telecommunications soft client 121 when operating in GUI-less mode 131 or may also map to telecommunications soft client 121 when telecommunications soft client 121 is operating in a mode with a GUI.

In some examples, mode select input 601 from above may also be global user input. Then user 141 can input mode select input 601 even when a window of telecommunications soft client 121 is not the focus window and still instruct telecommunications soft client 121 to enter GUI-less mode 131. Similarly, a global input command from user 141 may instruct telecommunications soft client 121 operating in GUI-less mode 131 to switch to a mode with a GUI. Other manners of switching telecommunications soft client 121 out of GUI-less mode 131 may also/instead be used.

Advantageously, operational scenario 500 and operational scenario 600 show that, even though telecommunications soft client 121 does not have a window to be a focus window when operating in GUI-less mode 131, user 141 can still receive audible descriptions of telecommunications soft client 121 and can still interact with telecommunications soft client 121 through global user input associated with telecommunications soft client 121. Also, since telecommunications soft client 121 does not rely on screen reader application 122 for narration, screen reader application 122 can operate on other applications without being affected by telecommunications soft client 121 ever being the focus window.

Figure 7:
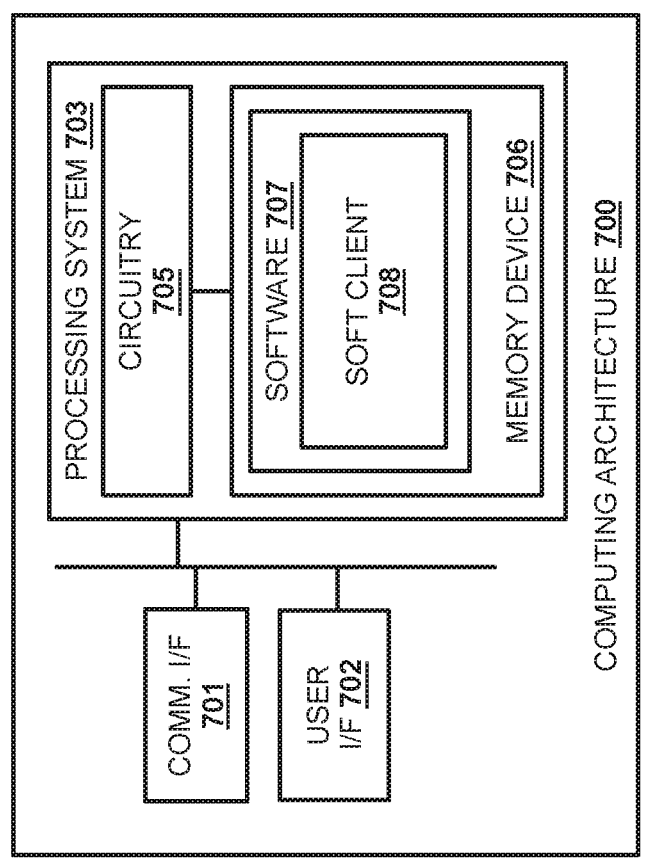
FIG. 7 illustrates a computing architecture for operating a telecommunications soft client in a GUI-less mode.

FIG. 7 illustrates computing architecture 700 for operating a telecommunications soft client in a GUI-less mode. Computing architecture 700 is an example computing architecture for user system 101, although user system 101 may use alternative configurations. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a computer readable storage medium, such as a disk drive, flash drive, data storage circuitry, or some other memory apparatus. In no examples would a storage medium of memory device 706 be considered a propagated signal. Operating software 707 comprises computer programs, firmware, or some other form of machine-readable processing instructions. Operating software 707 includes telecommunications soft client 708. Operating software 707 may further include an operating system, utilities, drivers, network interfaces, applications, or some other type of software. When executed by processing circuitry 705, operating software 707 directs processing system 703 to operate computing architecture 700 as described herein.

In particular, telecommunications soft client 708 directs processing system 703 to operating telecommunications soft client 708 in a first mode. In the first mode, computing architecture 700 does not present a GUI to a user for telecommunications soft client 708. A screen reader application is also executing on processing system 703. While in the first mode, telecommunications soft client 708 directs processing system 703 to audibly describe a first occurrence for the telecommunications soft client and receive global user input into the telecommunications soft client. The screen reader application describes a second occurrence for a first application executing, and displaying an application window, on computing architecture 700.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for operating a telecommunications soft client without a graphical user interface (GUI), the method comprising:
   in a user system, operating the telecommunications soft client in a first mode, wherein, in the first mode, the telecommunications soft client does not present a GUI of the telecommunications soft client to avoid interfering with narration provided by a screen reader application executing on the user system, wherein the narration describes one or more GUIs displayed by the user system;
   while in the first mode:
     audibly describing, by the telecommunications soft client, a first occurrence for the telecommunications soft client;
     receiving global user input into the telecommunications soft client; and
     wherein the screen reader application describes a second occurrence for a first application executing, and displaying an application window, on the user system.

2. The method of claim 1, further comprising:
   operating the telecommunications soft client in the first mode in response to determining that the screen reader application is executing on the user system.

3. The method of claim 1, further comprising:
   operating the telecommunications soft client in the first mode in response to input from a user selecting the first mode over at least a second mode that presents the GUI for the telecommunications soft client.

4. The method of claim 1, wherein the global user input comprises an instruction in an instruction group comprising:
a call answer instruction;
a call mute instruction;
a call hold instruction; and
a call initiation instruction.

5. The method of claim 1, wherein audibly describing the first occurrence comprises:
generating speech that conveys the first occurrence to a user.

6. The method of claim 1, wherein the first occurrence comprises an event in an event group comprising:
an incoming call request;
a new voicemail notification; and
a feature status notification.

7. The method of claim 1, wherein the application window is a current focus window on the user system.

8. The method of claim 1, wherein audibly describing the first occurrence uses a first speaker of the user system and wherein the screen reader application describes the second occurrence using a second speaker of the user system.

9. The method of claim 1, wherein audibly describing the first occurrence uses a first voice and wherein the screen reader application describes the second occurrence using a second voice.

10. The method of claim 1, wherein the global user input comprises a key combination input into a user interface of the user system that is mapped to the telecommunications soft client.

11. An apparatus for a user system executing a telecommunications soft client without a graphical user interface (GUI), the apparatus comprising:
one or more computer readable storage media;
a processing system operatively coupled with the one or more computer readable storage media; and
program instructions stored on the one or more computer readable storage media that, when read and executed by the processing system, direct the processing system to:
operate the telecommunications soft client in a first mode, wherein, in the first mode, the telecommunications soft client does not present a GUI of the telecommunications soft client to avoid interfering with narration provided by a screen reader application executing on the user system, wherein the narration describes one or more GUIs displayed by the user system;
while in the first mode:
audibly describe, by the telecommunications soft client, a first occurrence for the telecommunications soft client;
receive global user input into the telecommunications soft client; and
wherein the screen reader application describes a second occurrence for a first application executing, and displaying an application window, on the user system.

12. The apparatus of claim 11, wherein the program instructions further direct the processing system to:
operate the telecommunications soft client in the first mode in response to determining that the screen reader application is executing on the user system.

13. The apparatus of claim 11, wherein the program instructions further direct the processing system to:
Operate the telecommunications soft client in the first mode in response to input from a user selecting the first mode over at least a second mode that presents the GUI for the telecommunications soft client.

14. The apparatus of claim 11, wherein the global user input comprises an instruction in an instruction group comprising:
a call answer instruction;
a call mute instruction;
a call hold instruction; and
a call initiation instruction.

15. The apparatus of claim 11, wherein to audibly describe the first occurrence, the program instructions direct the processing system to:
generate speech that conveys the first occurrence to a user.

16. The apparatus of claim 11, wherein the first occurrence comprises an event in an event group comprising:
an incoming call request;
a new voicemail notification; and
a feature status notification.

17. The apparatus of claim 11, wherein the application window is a current focus window on the user system.

18. The apparatus of claim 11, wherein a first speaker of the user system is used to audibly describe the first occurrence and wherein the screen reader application uses a second speaker of the user system to describe the second occurrence.

19. The apparatus of claim 11, wherein a first voice is used to audibly describe the first occurrence and wherein the screen reader application uses a second voice to describe the second occurrence.

20. One or more computer readable storage media having program instructions stored thereon for executing a telecommunications soft client, on a user system, without a graphical user interface (GUI), the program instructions, when read and executed by a processing system, direct the processing system to:
operate the telecommunications soft client in a first mode, wherein, in the first mode, the telecommunications soft client does not present a GUI of the telecommunications soft client to avoid interfering with narration provided by a screen reader application executing on the user system, wherein the narration describes one or more GUIs displayed by the user system;
while in the first mode:
audibly describe, by the telecommunications soft client, a first occurrence for the telecommunications soft client;
receive global user input into the telecommunications soft client; and
wherein the screen reader application describes a second occurrence for a first application executing, and displaying an application window, on the user system.

* * * * *